US007756617B1

(12) United States Patent
Cluff et al.

(10) Patent No.: US 7,756,617 B1
(45) Date of Patent: Jul. 13, 2010

(54) VEHICULAR MONITORING SYSTEM

(75) Inventors: Larry Allen Cluff, Salt Lake City, UT (US); David LeBaron Morgan, 1 E. Center St., Suite 207, Provo, UT (US) 84606

(73) Assignee: David Lebaron Morgan, Provo, UT (US)

( * ) Notice: Subject to any disclaimer, the term of this patent is extended or adjusted under 35 U.S.C. 154(b) by 533 days.

(21) Appl. No.: 11/035,650

(22) Filed: Jan. 14, 2005

Related U.S. Application Data

(60) Provisional application No. 60/536,611, filed on Jan. 15, 2004.

(51) Int. Cl.
*G01M 17/00* (2006.01)

(52) U.S. Cl. .................... 701/35; 701/208; 342/357.01; 342/357.08; 340/476

(58) Field of Classification Search ................ 701/200, 701/215, 34–35, 208–211; 342/357.01, 35, 342/357.08; 340/476, 478
See application file for complete search history.

(56) References Cited

U.S. PATENT DOCUMENTS 4,593,263 A 6/1986 Peckworth
4,875,167 A 10/1989 Price
5,267,159 A 11/1993 O'Neall
5,337,236 A * 8/1994 Fogg et al. .................... 701/35
5,428,542 A 6/1995 Liesveld
5,550,738 A * 8/1996 Bailey et al. ............. 455/456.5
5,579,242 A 11/1996 Fisher
5,642,106 A * 6/1997 Hancock et al. ............. 340/988
5,694,322 A 12/1997 Westerlage
5,748,148 A 5/1998 Heiser
5,787,373 A 7/1998 Migues
5,848,373 A * 12/1998 DeLorme et al. ............ 701/200
5,893,893 A 4/1999 Holt (Continued)

OTHER PUBLICATIONS

Visual odometer for pedestrian navigation; Jirawimut, R.; Prakoonwit, S.; Cecelja, F.; Balachandran, W.; Instrumentation and Measurement, IEEE Transactions on; vol. 52, Issue 4, Aug. 2003 pp. 1166-1173; Digital Object Identifier 10.1109/TIM.2003.815996.*

(Continued)

*Primary Examiner*—Cuong Nguyen
(74) *Attorney, Agent, or Firm*—Kirton & McConkie

(57) ABSTRACT

A portable electronic device is disclosed. The electronic device can be used inside a motor vehicle to collect and store information regarding operation of the motor vehicle. The electronic device can include a processor and a digital memory. The processor can determine miles traveled by the motor vehicle during a trip and store data representing the miles in the digital memory with a trip identifier identifying the trip. The miles traveled can be determined using data from a location sensor, such as a global positioning satellite device, that determines locations of the motor vehicle during the trip. The electronic device can also include an audio mechanism into which a user can speak information about the trip. Such audio data can be stored in the digital memory and associated with the trip identifier. Other data representing information about the trip can also be stored in the digital memory. The electronic device can also include a mechanism for transferring data stored in the digital memory in association with the trip identifier to a computing device.

14 Claims, 3 Drawing Sheets

U.S. PATENT DOCUMENTS

| | | | | | |
|---|---|---|---|---|---|
| 5,899,956 | A | * | 5/1999 | Chan | 701/213 |
| 5,905,461 | A | | 5/1999 | Neher | |
| 5,948,040 | A | * | 9/1999 | DeLorme et al. | 701/201 |
| 5,961,571 | A | * | 10/1999 | Gorr et al. | 701/207 |
| 6,047,235 | A | * | 4/2000 | Hiyokawa et al. | 701/201 |
| 6,049,753 | A | * | 4/2000 | Nimura | 701/201 |
| 6,064,929 | A | | 5/2000 | Migues | |
| 6,072,429 | A | | 6/2000 | Crothall | |
| 6,087,965 | A | | 7/2000 | Murphy | |
| 6,088,636 | A | | 7/2000 | Chigumira | |
| 6,088,650 | A | | 7/2000 | Schipper | |
| 6,098,015 | A | * | 8/2000 | Nimura et al. | 701/209 |
| 6,125,323 | A | * | 9/2000 | Nimura et al. | 701/207 |
| 6,138,072 | A | | 10/2000 | Nagai | |
| 6,141,609 | A | | 10/2000 | Herdeg | |
| 6,141,610 | A | | 10/2000 | Rothert | |
| 6,144,916 | A | | 11/2000 | Wood, Jr. | |
| 6,154,658 | A | * | 11/2000 | Caci | 455/466 |
| 6,282,491 | B1 | | 8/2001 | Bochmann | |
| 6,301,533 | B1 | | 10/2001 | Markow | |
| 6,314,364 | B1 | * | 11/2001 | Nakamura | 701/200 |
| 6,363,304 | B1 | | 3/2002 | Ramsey | |
| 6,434,510 | B1 | | 8/2002 | Callaghan | |
| 6,704,434 | B1 | * | 3/2004 | Sakoh et al. | 382/104 |
| 6,741,933 | B1 | | 5/2004 | Glass | |
| 6,765,528 | B2 | * | 7/2004 | Tranchina et al. | 342/357.1 |
| 6,941,220 | B2 | * | 9/2005 | Le et al. | 701/208 |
| 7,013,205 | B1 | * | 3/2006 | Hafner et al. | 701/22 |
| 7,053,780 | B1 | * | 5/2006 | Straub et al. | 340/601 |
| 7,137,099 | B2 | * | 11/2006 | Knight et al. | 717/100 |
| 2002/0049535 | A1 | * | 4/2002 | Rigo et al. | 701/211 |
| 2003/0055689 | A1 | * | 3/2003 | Block et al. | 705/5 |
| 2003/0080897 | A1 | * | 5/2003 | Tranchina et al. | 342/357.1 |
| 2003/0235282 | A1 | * | 12/2003 | Sichelman et al. | 379/201.03 |
| 2004/0236498 | A1 | * | 11/2004 | Le et al. | 701/200 |
| 2004/0260470 | A1 | * | 12/2004 | Rast | 701/300 |
| 2005/0055353 | A1 | * | 3/2005 | Marx et al. | 707/10 |

OTHER PUBLICATIONS

Frame Registration of In-Vehicle Normal Camera with Omni-Directional Camera for Self-Position Estimation; Uchiyama, H.; Takahashi, T.; Ide, I.; Murase, H.; Innovative Computing Information and Control, 2008. ICICIC '08. 3rd International Conference on; Jun. 18-20, 2008 pp. 7-7; Digital Object Identifier 10.1109/ICICIC.2008. 283.*

A Probabilistic Framework for Multi-Sensor, Multi-Detector Localization Systems: Application to Vehicle Guidance; Tessier, C.; Debain, C.; Chapuis, R.; Chausse, F.; Robotics and Biomimetics, 2006. ROBIO '06. IEEE International Conference on Dec. 17-20, 2006 pp. 864-871; Digital Object Identifier 10.1109/ROBIO.2006. 340334.*

Active Perception Strategy for Vehicle Localisation and Guidance; Tessier, C.; Debain, C.; Chapuis, R.; Chausse, F.; Robotics, Automation and Mechatronics, 2006 IEEE Conference on; Jun. 1-3, 2006 pp. 1-6; Digital Object Identifier 10.1109/RAMECH.2006.252648.*

Vanet Routing on City Roads Using Real-Time Vehicular Traffic Information; Nzouonta, J.; Rajgure, N.; Guiling Wang; Borcea, C.; Vehicular Technology, IEEE Transactions on; vol. 58, Issue 7, Sep. 2009 pp. 3609-3626; Digital Object Identifier 10.1109/TVT.2009. 2014455.*

Lane-Change Fuzzy Control in Autonomous Vehicles for the Overtaking Maneuver; Naranjo, J. E.; Gonzalez, C.; Garcia, R.; de Pedro, T.; Intelligent Transportation Systems, IEEE Transactions on; vol. 9, Issue 3, Sep. 2008 pp. 438-450 Digital Object Identifier 10.1109/ TITS.2008.922880.*

Clustering-based multi-channel Vehicle-to-Vehicle (V2V) communication system; Ranran Ding; Qing-An Zeng; Ubiquitous and Future Networks, 2009. ICUFN 2009. First International Conference on; Jun. 7-9, 2009 pp. 83-88; Digital Object Identifier 10.1109/ ICUFN.2009.5174290.*

Proposal of Distribution Scheme for Vehicle Information in ITS Networks; Naito, K.; Sato, K.; Mori, K.; Kobayashi, H.; Networks, 2009. ICN '09. Eighth International Conference on; Mar. 1-6, 2009 pp. 427-433; Digital Object Identifier 10.1109/ICN.2009.30.*

SVATS: A Sensor-Network-Based Vehicle Anti-Theft System; Hui Song; Sencun Zhu; Guohong Cao; INFOCOM 2008. The 27th Conference on Computer Communications. IEEE; Apr. 13-18, 2008 pp. 2128-2136; Digital Object Identifier 10.1109/INFOCOM.2008. 279.*

IWAY: Towards highway vehicle-2-vehicle communication and driver support; Rigas, G.; Bougia, P.; Fotiadis, D.I.; Katsis, C.D.; Koutlas, A.; Systems, Man and Cybernetics, 2008. SMC 2008. IEEE International Conference on; Oct. 12-15, 2008 pp. 3376-3381; Digital Object Identifier 10.1109/ICSMC.2008.4811819.*

Ticket-based reliable routing in Vanet; Yan, G.; Rawat, D.B.; El-Tawab, S.; Mobile Adhoc and Sensor Systems, 2009. MASS '09. IEEE 6th International Conference on; Oct. 12-15, 2009 pp. 609-614; Digital Object Identifier ; 10.1109/MOBHOC.2009.5336948.*

T. Taleb et al., "A stable routing protocol to support its services in VANETs," IEEE Trans. Veh. Technol., vol. 56, No. 6, pp. 3337-3347, Nov. 2007.*

V. Naumov and T. Gross, "Connectivity-aware routing (CAR) in vehicular; ad hoc networks," in Proc. IEEE Int. Conf. Comput. Commun., Anchorage, AK, May 2007, pp. 1919-1927.*

M. Jerbi, R. Meraihi, S.-M. Senouci, and Y. Ghamri-Doudane, "Gytar: Improved greedy traffic aware routing protocol for vehicular ad hoc networks in city environments," in Proc. 3rd ACM Int. Workshop VANET, Los Angeles, CA, Sep. 2006, pp. 88-89.*

"Task 3 Final Report," Identify Intelligent Vehicle Safety Applications; Enabled by DSRC, DOT HS 809 859, Mar. 2005 (last accessed; Jul. 2008). [Online]. Available: http://www-nrd.nhtsa.dot.gov/pdf/ nrd-12/ 1665CAMP3web/index.html.*

K.-T. Feng, C.-H. Hsu, and T.-E. Lu, "Velocity-assisted predictive mobility and location-aware routing protocols for mobile ad hoc networks,"; IEEE Trans. Veh. Technol., vol. 57, No. 1, pp. 448-464, Jan. 2008.*

V. Namboodiri and L. Gao, "Prediction-based routing for vehicular ad hoc networks," IEEE Trans. Veh. Technol., vol. 56, No. 4, pp. 2332-2345, Jul. 2007.*

H.-Y. Huang, P.-E. Luo, M. Li, D. Li, X. Li, W. Shu, and M.-Y. Wu, "Performance evaluation of SUVnet with real-time traffic data," IEEE; Trans. Veh. Technol., vol. 56, No. 6, pp. 3381-3396, Nov. 2007.*

X. Ma, M.-T. Sun, G. Zhao, and X. Liu, "An efficient path pruning; algorithm for geographical routing in wireless networks," IEEE Trans.; Veh. Technol., vol. 57, No. 4, pp. 2474-2488, Jul. 2008.*

T. Taleb, E. Sakhaee, A. Jamalipour, K. Hashimoto, N. Kato, and Y. Nemoto, "A stable routing protocol to support its services in VANETs," IEEE Trans. Veh. Technol., vol. 56, No. 6, pp. 3337-3347, Nov. 2007.*

* cited by examiner

VEHICULAR MONITORING SYSTEM

CROSS-REFERENCE TO RELATED APPLICATIONS

This application claims the benefit of provisional patent application Ser. No. 60/536,611, filed 2004 Jan. 15 by the present inventors.

FEDERALLY SPONSORED RESEARCH

Not Applicable

SEQUENCE LISTING OR PROGRAM

Not Applicable

BACKGROUND OF THE INVENTION

1. Field of Invention

The present invention relates generally to methods for monitoring vehicles, specifically to mileage tracking devices.

2. Prior Art

The need for systems that collect and record information about the usage of a vehicle is well known. Such systems are frequently employed to catalog the operation of a vehicle as being related to business or personal usage. A drawback of these systems concern the inflexibility with which user data may be input, correlated, and retrieved.

In order to best view the advantages of the present invention, a summary of the most relevant prior art follows:

U.S. Pat. No. 6,741,933 (2004) to Glass discloses a software and hardware apparatus for tracking tax-deductible mileage.

U.S. Pat. No. 6,141,610 (2000) to Rothert, et al. discloses a vehicle operation method and apparatus for monitoring usage and condition of a vehicle including mileage, gas used, collision damage, area of operation, time of usage.

U.S. Pat. No. 6,141,609 (2000) to Herdeg, et al. discloses a method of collecting a vehicle itinerary determining the length of travel, time of travel, and the routing as in a trip journal and determining who drove the vehicle.

U.S. Pat. No. 5,694,322 (1997) to Westerlage, et al. discloses a method for determining tax of a vehicle. It includes a positioning device operable to determine a plurality of vehicle positions along a route traveled by the vehicle. A memory stores geographic information defusing a plurality of taxing regions through which the route of the vehicle passes. The object being to determine the tax for the vehicle in at least one taxing region through which the route of the vehicle passes.

U.S. Pat. No. 5,748,148 (1998) to Heiser, et al. discloses a positional information storage and retrieval system and method. It consists of a plurality of receiver/transmitter units and a processor unit. Coordinate information of receiver/transmitter units is received by the positional information unit and used to determine the positional information according to triangulation or other techniques embodied within the positional detection unit. Algorithms embodied within the processor unit generate, update and control access to a database of information relating to locations of the subjects within the operational environment over time.

U.S. Pat. No. 5,906,461 (1999) to Neher discloses a method utilizing a global positioning and tracking system for locating one of a person and item of property.

U.S. Pat. No. 6,144,916 (2000) to Wood, Jr., et al discloses a method and apparatus for a base station or interrogator station to monitor the itinerary of one or more vehicles or other movable assets.

U.S. Pat. No. 6,138,072 (2000) to Nagai discloses a navigation device for use in a vehicle which is capable of determining and displaying a current position of the vehicle on a road map indicated on a display screen via internet communication means.

U.S. Pat. No. 6,072,429 (2000) to Crothall, et al. discloses an integrated position determination system and radio transceiver.

U.S. Pat. No. 6,088,650 (2000) to Schipper, et al. discloses a vehicle location system for monitoring location, speed, and odometer of a vehicle.

U.S. Pat. No. 6,087,965 (2000) to Murphy discloses a calibration means for a vehicle mileage meter or taximeter.

U.S. Pat. No. 5,428,542 (1995) to Liesveld discloses an apparatus for analog recording of audible information about a trip.

U.S. Pat. No. 6,741,933 tries to automate the process of categorizing tax-deductible mileage by designating stop locations and trip segments as tax-deductible. When driving, the apparatus will automatically categorize those stop locations and segments as tax-deductible. Later, the data is moved to a base station and the user is able to review the trips and add or subtract tax-deductible mileage as needed.

While prior art is able to record mileage, location, or category information; none of the prior art is able to serve as a system for automatically recording any type of information related to a trip. For example, there is a need to have a platform that is capable of recording any information occurring between the start and the end of a trip.

What is needed is a more accurate and flexible system for users to be able to determine the category for a trip while en-route, and the ability to categorize into multiple tax-deductible categories such as medical, charity, or business. In addition, users need a way to categorize into other categories such as for specific accounts. En-route categorization allows immediate display of estimated tax deductions, display of mileage for particular categories, and display of other information related to that category.

While the apparatus of U.S. Pat. No. 6,741,933 has the capability to categorize segments and stops into a tax-deductible category; it does not have the en-route capability to record the destination, purpose or other information the vehicle operator would want to capture about the trip. What is needed is a way for the vehicle operator to verbally annotate the trip to add information about the trip that is not easily input in other ways.

While the apparatus of U.S. Pat. No. 6,741,933 has the capability to download route information to a base unit where mileage is calculated, it does not have the capability to calculate mileage en-route. What is needed is a way to calculate mileage en-route so as to be able to display trip mileage to the vehicle operator and use it for real-time calculation and display of an estimated tax-deduction.

Additionally, a way is needed to conserve memory space. If mileage is calculated en-route then route information can be discarded.

While the apparatus of U.S. Pat. No. 6,741,933 and other prior art has the capability to categorize segments and/or stops as being tax-deductible or not, they do not have the capability to allow the vehicle operator to continue a segment or ignore a stop en-route using a "continue" button (meaning the segment is a continuation of the last segment driven). Since trips may include multiple segments and/or multiple stops, what is needed is a way to group them together real-time en-route so that mileage and other information are recorded per trip, and can be displayed as the trip is happening.

While the prior art has the capability to detect the start and end of a trip by means of the door being opened or the car being started, what is needed is a way to detect the beginning and ending of a trip by location movements. In this way, a device does not have to be attached to signals from the vehicle or other related devices (such as the remote control).

While prior art has used GPS receivers to calculate distance, there are some inherent disadvantages to this method. One issue is that the GPS mileage calculation may or may not match the vehicle odometer. Calibration is required to correlate the two mileage instruments. What is needed is an optical means for reading the vehicle odometer so no calibration is required.

In addition to the issue of calibration, GPS receivers have the inherent issue of loss of satellite signal in hard to reach areas such as canyons, in urban areas with tall building, under bridges, and inside parking garages. What is needed is an optical means for recording the vehicle odometer so that mileage can be recorded in these "dead" spots.

Another need for vehicular monitoring is to have a device that can record the information shown on the vehicle's instrument panel during trips. Instruments that need monitoring capability include: the odometer, the speedometer, warning indicators, RPM indicator, fuel indicator, trip odometer, headlight status, and so forth.

Other prior devices heretofore known suffer from a number of disadvantages:

1. They do not allow provide a platform designed specifically to record and relate any digitally presented information to a particular trip.
2. They do not allow a vehicle operator to specify the category of a trip real-time while en-route.
3. They do not allow a vehicle operator to annotate a trip and related data and information with verbal information.
4. They do not calculate and display an estimated tax deduction in real-time.
5. They do not have the en-route capability to press a button or provide other en-route user input to indicate that the current segment is a continuation of the prior trip.
6. They do not have the capability to detect the start and the end of a trip by using movement of the vehicle; and thus must be electronically attached to the vehicle in some way to receive a vehicular signal indicating a start and end to a trip. They cannot operate independently of the vehicle.
7. They have to be calibrated to match the vehicle odometer.
8. They typically use a GPS receiver for mileage calculation and the GPS receiver may be unreliable in certain situations.
9. They do not have the capability to record status of display devices on the vehicle instrument panel.

OBJECTS AND ADVANTAGES

Accordingly, besides the objects and advantages of the flexible closures described in my above patent, several objects and advantages of the present invention are:

1. to provide a platform to which any digitally presented information can be recorded and related to a particular trip
2. to provide a real-time means for a en-route vehicle operator to provide categorization information about a particular trip
3. to provide a real-time means for an en-route vehicle operator to verbally annotate a trip and/or other recorded information related to a trip.
4. to provide a real-time means for displaying mileage and estimated tax-deductions within particular categories while en-route.
5. to provide a real-time means for an en-route vehicle operator to continue a prior trip.
6. to provide a means for using movement sensing to indicate the start and the end of a trip.
7. to provide an optical means for calculating mileage so that calibration is not needed.
8. to provide an optical means for calculating mileage so that reliability is improved.
9. to provide an optical means for capturing vehicular status during trips.

Further objects and advantages will become apparent from a consideration of the ensuing description and drawings.

SUMMARY

In accordance with the present invention, a vehicular monitoring system comprises:

(1) A memory
(2) Means for processing
(3) Means for detecting the beginning of a trip
(4) Means for detecting the ending of a trip
(5) Means for collecting data from a plurality of sources during the trip into the memory
(6) Means for relating data collected into the memory during a trip; whereby data collected during a trip can eventually be represented as a related set of data that is further analyzed and processed.

DRAWINGS

Figures

REFERENCE NUMERALS

20 Vehicle Monitoring System
22 Processing Means
24 Coupling to Memory
26 Memory
28 Digital Audio Output Means
30 Coupling to Digital Audio Output Means
32 Coupling from Digital Audio Input Means
34 Digital Audio Input Means
36 Coupling to Image Capture Means
38 Image Capture Means
40 Coupling to Input Means
42 Input Means
46 Display Means
48 Location Sensing Means

50 Coupling to Location Sensing Means
52 Coupling to Display Means
54 Vehicular Coupling Means
100 Remote Processing system
200 Flow chart for Vehicular. Monitoring System
310 Vehicular Dashboard
330 Vehicular Instrument Panel
340 Speedometer
350 Odometer

DETAILED DESCRIPTION

Figure 1:
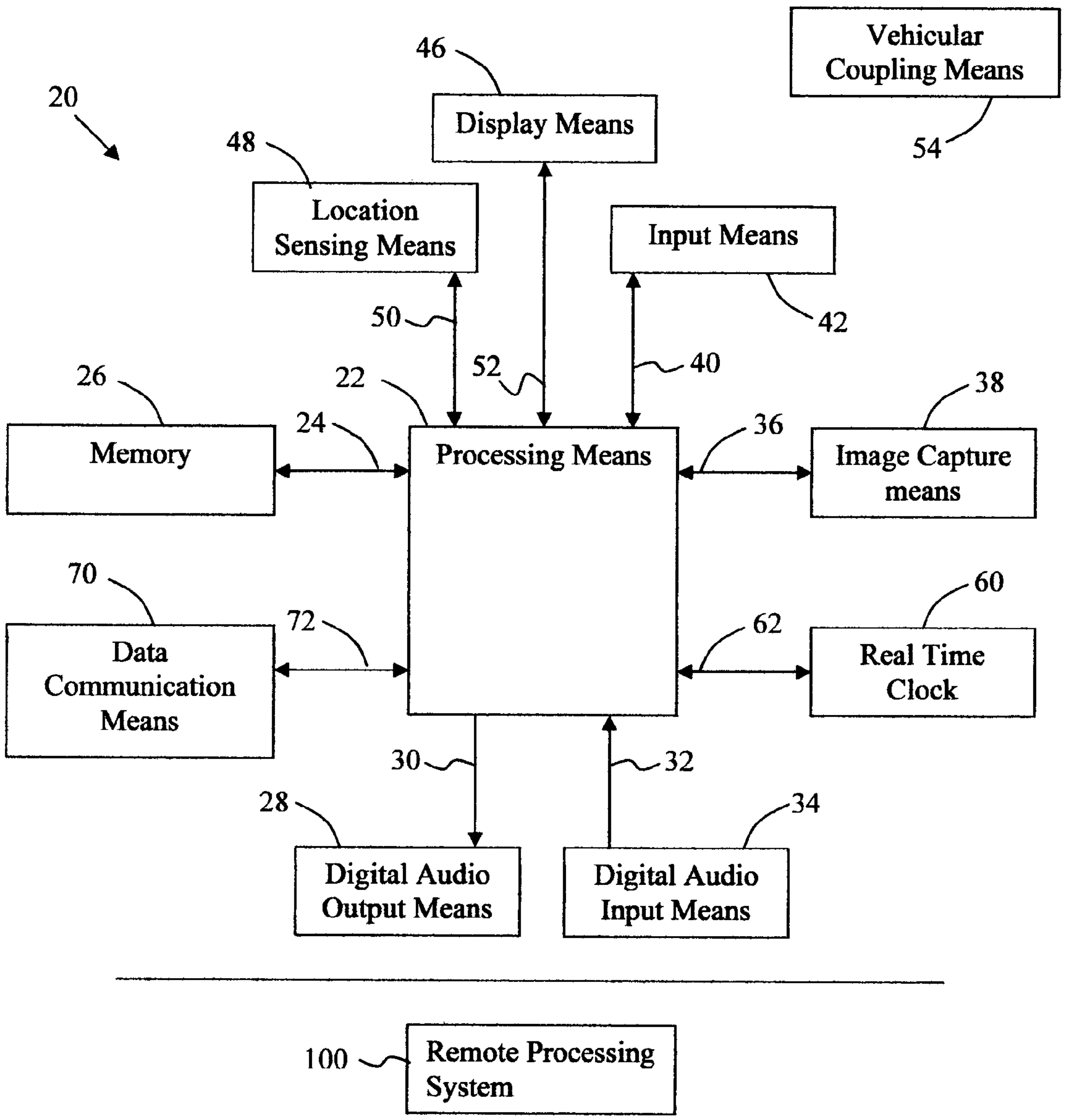
FIG. 1 is a schematic illustration of a vehicular monitoring system constructed in accordance with the teachings of the present invention.
Figure 2:
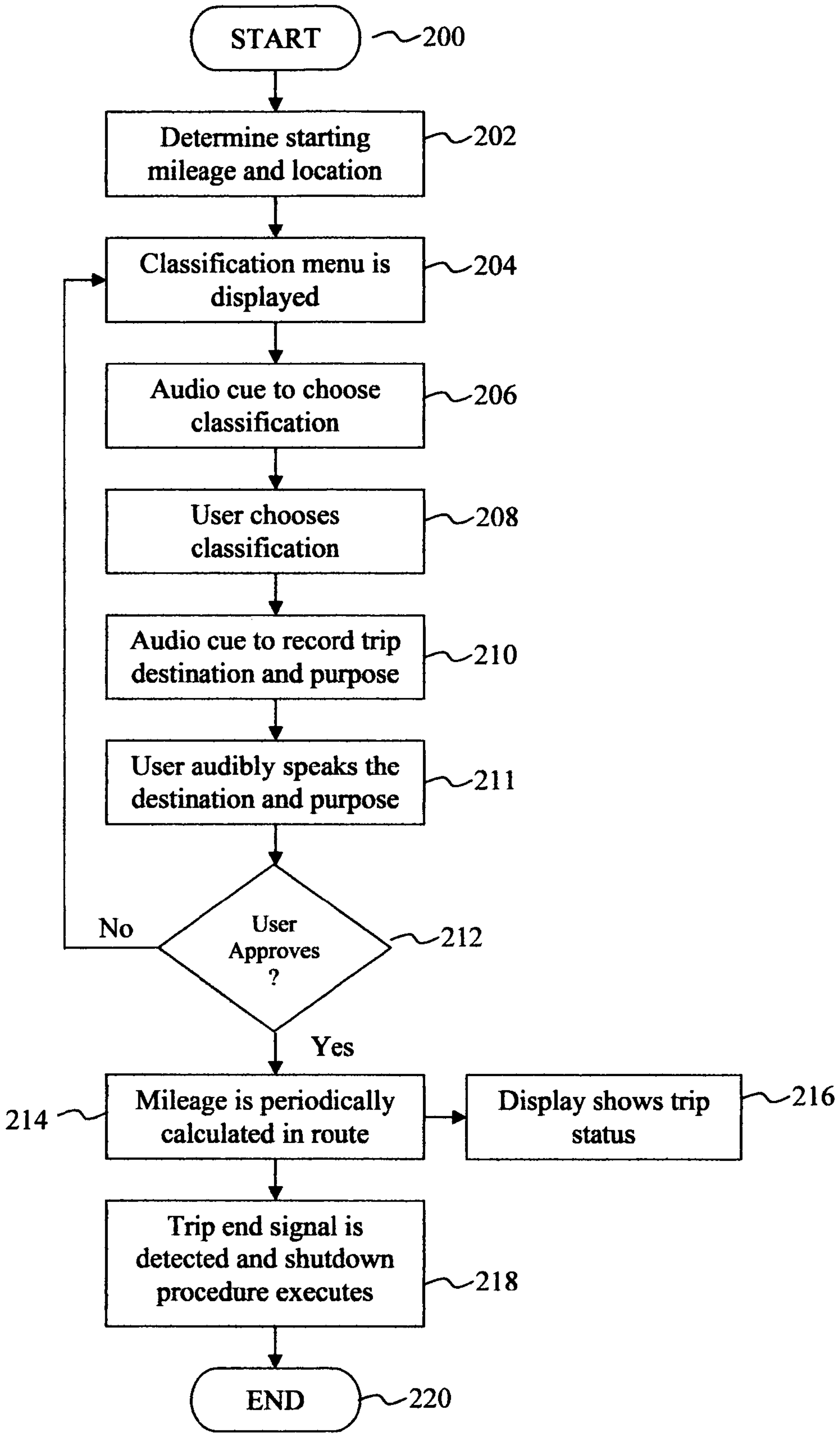
FIG. 2 is a schematic illustration of the method of the present invention in flowchart form.
Figure 3:
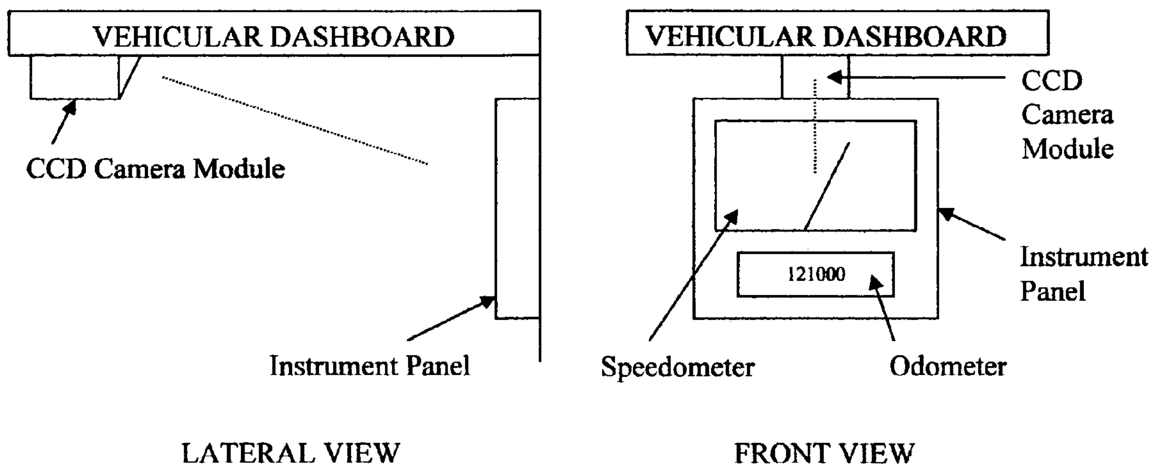
FIG. 3 is a schematic illustration of a potential alignment of an Image Capture Means as described in accordance with the teachings of the present invention.

Preferred Embodiment—FIG. 1-3

With reference to FIG. 1 of the drawings, an exemplary vehicular monitoring system for practicing the method of the present invention is generally indicated by reference numeral 20. Monitoring system is optionally coupled to Vehicular Coupling Means 54 which is the vehicle's cigarette lighter socket in one embodiment. When the vehicle's ignition is turned on, power is supplied to Vehicular Coupling Means 54. When the vehicle's ignition is turned off, power is removed from Vehicular Coupling Means 54. The application of power to 54 acts as a trigger to the Processing Means 22 to begin processing as described in FIG. 2. The processing means in this embodiment is a microcontroller. When power is removed from 54, the Processing Means senses the removal as the end of a trip and processes shutdown procedures before power at 54 has reached a level that causes Processing Means 22 to stop functioning. Application of power to 54 acts as a signal to indicate to the Processing Means 22 that the trip is beginning. When this signal is received, Processing Means 22 starts executing instructions (see step 200 of FIG. 2).

In step 202 of FIG. 2, location and starting mileage are determined. Location Sensing Means 48 automatically begins determining the starting location. The location sensing means in this embodiment is a GPS Module that produces location information independently. When the starting location is determined, Processing Means 22 acquires location information serially from Location Sensing Means 48 and stores it in Memory 26 along with the unique identifier and the date and time acquired from the Real Time Clock 60. Additionally, Processing Means 22 uses accumulated location information to calculate distance and stores this distance calculation in memory 26 along with a unique trip identifier and date and time stamp. Memory 26 can be of any type including, but not limited to, Compact Flash, SD Memory, XD Memory, ROM, RAM, hard disk drive, CD ROM drive, etc.

Processing Means 22 can stores a unique trip identifier that represents grouped information as well as the date and time acquired from the Real Time Clock 60 with the data that Processing Means 22 stores to the Memory 26. In this way, data from any of the instruments are associated. For example, Processing Means 22 can store location data, mileage data, odometer data, instrument panel data, audio data, and image capture data under the same unique trip identifier thus associating the data for a particular trip. Starting mileage is determined with the following process. Image Capture Means 38 has been aligned to capture an image of vehicular instrument Display(s) (see FIG. 3). In the preferred embodiment the Image Capture Means 38 is a CCD camera module. Processing Means 22 instructs the Image Capture Means 38 to capture an image. During or after the process of capturing an image, Processing Means 22 acquires image data from the Image Capture Means 38 and stores it in memory 26 with the unique identifier and a date and time stamp provided by the Real Time Clock 60. Processing Means 22 then processes the stored image using an Optical Character Recognition (OCR) procedure to convert the portion of the image pointing to the odometer digits into digitally recognizable characters. Processing Means 22 then stores the digits into memory 26 using the unique trip identifier and a date and time provided by Real Time Clock 60. Both the captured image and the digits obtained by OCR of the image represent the starting odometer reading for a particular trip.

At the same time as an image is captured of the odometer, Image Capture Means 38 may also be aligned to capture other instruments within its field of view. It can at any time be instructed by Processing Means 22 to capture images that include within its field of view other vehicular instruments such as the speedometer, oil gauges, indicator lights, trip odometer, etc. With or without additional processing, this imaging capability is particularly useful for determining how a particular operator drives and maintains the vehicle, to determine vehicle health, or to warn an operator when a particular instrument activates or reaches a particular level.

In step 204 of FIG. 2, Processing Means 22 then communicates with Display Means 46 to display the default classification (i.e. Business—or a user defined value as defined previously on the compact flash), and to display menu selection options (PREV, NXT, OK, CONT). In this embodiment, Input Means 42 is a series of buttons. Display Means 46 is directly above Input Means 42 and the menu selection options are displayed such that there is an association with the display menu items and each button of the Input Means 42.

In step 206 of FIG. 2, Processing Means 22 streams audio data from Memory 26, to the Audio Output Means 28. Audio Output Means 28 broadcasts it audibly to the user. In this case, the audio played is, "Please enter a classification for this trip." The device could be configured to produce other audio messages as well.

In step 208 of FIG. 2, a user uses Input Means 42 to select the corresponding menu option on the Display Means 46. In this case, there is a list of potential classifications and a user presses PREV to Display a prior classification, NXT to Display the next classification, OK to choose the classification being displayed, and CONT to indicate to Processing Means 22 that this is a continuation of the last trip.

In step 210 of FIG. 2, Processing Means 22 streams audio out to Audio Output Means 28. The audio that is played is, "Record the destination and purpose of this trip".

In step 211 of FIG. 2, Processing Means 22 streams audio in through audio input circuitry 34 and into memory 26. While Processing Means 22 is recording, the user speaks whatever information is pertinent to the trip such as the trip destination and purpose. When the user is done, the user shuts off the recording by using Input Means 42 implemented in this embodiment by a stop button, or the device will time out after a predetermined time period (such as 10 seconds).

In step 212 of FIG. 2, Processing Means 22 causes Display Means 46 to Display "CORRECT?" with menu items: PLAY, REC, OK. If the user presses PLAY, device 20 will play back the recording. If the user presses REC, device 20 will start over at step 204 of FIG. 2. If the user presses OK then the device will move on to step 214 of FIG. 2.

In step 214 of FIG. 2, the Processing Means 22 periodically recalculates the mileage using location information provided by Location Sensing Means 48. Additionally, Processing Means 22 periodically recalculates the mileage using the Image Capture Means 38 as described above. Processing Means 22 displays either mileage calculation on Display Means 46 along with menu options: PREV, NXT. A user can press PREV or NXT to Display configurable items such as: trip tax deduction, total tax deduction, total business miles, and so forth.

Removal of vehicular power at 54 acts as a signal to indicate to Processing Means 22 the end of each trip and to commence step 218 of FIG. 2. It is assumed that when power is shut off at Vehicular Coupling 54 that capacitance causes voltage to Processing Means 22 to decay at a rate that will allow the Processing Means 22 to process shutdown procedures before the voltage reaches an out-of-spec condition. During the shutdown processing, Processing Means 22 retrieves location data from Location Sensing Means 48 to make a final mileage calculation and stores this mileage into memory 26 using the unique identifier and date and time. Processing Means 22 captures another image with the Image Capture Means 38 and converts the odometer image to digital characters as described above, and then stores this data to Memory 26 using the unique identifier and the date and time provided by Real Time Clock 60.

Remote Processing System 100 can communicate with Processing Means 22 via Data Communication Means 70. Data Communication Means can be by RF, direct electronic coupling, optical coupling, or any other applicable communication connection. Processing Means 22 can communicate information from any accessible portion of the device 20 through Data Communication Means 70. For example, the processor can send location information from the Location Sensing Means 48, from Memory 26, from the Real Time Clock 60, or any other coupled device.

Memory 26 can be removed from device 20 and connected to Remote Processing System 100. In this way, Remote Processing System 100 can access all data captured by device 20. Remote Processing System 100 can change configuration information on Memory 26 so that when the Memory 26 is re-attached to device 20, Processing Means 22 processes information related to device 20 in a different way. For example, audio messages can be added, deleted, and modified; sequencing of the program flow can be modified; display items can be added, deleted, and modified; and classifications can be added, deleted, and modified.

In addition to storing information in Memory 26, Processing Means 22 can store portions of information processed directly to Remote Processing System 100 via Data Communication Means 70. This provides the potential for removing Memory 26 from device 20 with no adverse affect—thus reducing cost. Additionally, it provides a convenient way to store data so that there is no need for Processing Means to transfer data from Memory 26 to Data Communication Means 70, nor to physically move Memory 26 from device 20 to Remote Processing System 100.

Coupling of Location Sensing Means 48, Display Means 46, Input Means 42, Image Capture Means 38, Real Time Clock 60, Digital Audio Input Means 34, Digital Audio Output Means 28, Data Communication Means 70, and Memory 26 to Processing Means 22 can be accomplished via physical connections such as on a printed circuit board, RF coupling, acoustic coupling, optical coupling or any other applicable coupling means. Additionally, any applicable communication protocol may be used between Processing Means 22 and devices 48, 46, 42, 38, 60, 34, 28, 70, and 26.

Description

Alternate Embodiment FIG. 1-2

In another embodiment, the OCR processing can be done later by the Remote Processing System 100.

For the case where Vehicular Coupling Means 54 does not turn on and shut off with the vehicle's ignition, Vehicular Coupling Means 54 is not required. Instead, Processing Means 22 periodically checks to see if the location has changed, the odometer has changed, or other instrument panel instruments have changed to indicate the vehicle has not moved for a predetermined period of time. If the vehicle has not moved over that predetermined time, Processing Means 22 processes end of trip procedures, and then waits for a location change indication from one of the sensors (48 or 38). When the vehicle begins moving again—detection by Processing Means 22 detecting a location change from Location Sensing Means 48, odometer change from Image Capture Means 38, or other instrument panel instrument change from Image Capture Means 38—

Processing Means 22 responds by beginning the process as described in FIG. 2.

In another embodiment, Display Means 46 is removed from the system, and steps 204 and 216 of FIG. 2 are removed. This reduces the cost of the device and simplifies the procedure, but also reduces the flexibility of the device. To provide for classification for each trip, Input Means 42 is a series of labeled buttons, each button having one or two classifications. When a user presses a button for less than one second, the device selects the first classification. When a user presses the button for more than one second, the device selects the second classification. In addition to the classification buttons, there is also a continue button. When this button is selected, the current trip data is appended to the last trip instead of creating a new trip; thus effectively extending the last trip.

ADVANTAGES

From the description above, a number of advantages of the Vehicular Monitoring System become evident:

1. It provides a platform to which any digitally presented information can be recorded and related to a particular trip
2. It provides a real-time means for a en-route vehicle operator to provide categorization information about a particular trip
3. It provides a real-time means for an en-route vehicle operator to verbally annotate a trip and/or other recorded information related to a trip.
4. It provides a real-time means for displaying mileage and estimated tax-deductions within particular categories while en-route.
5. It provides a real-time means for an en-route vehicle operator to continue a prior trip.
6. It provides a means for using movement sensing to indicate the start and the end of a trip.
7. It provides an optical means for calculating mileage so that calibration is not needed.
8. It provides an optical means for calculating mileage.
9. It provides an optical means for capturing vehicular display status during trips.

CONCLUSION, RAMIFICATIONS, AND SCOPE

Accordingly, the reader will see that the vehicular monitoring system provided for in this patent provides numerous advantages to assist vehicle owners to monitor their vehicle and to provide trip information about the vehicle. This information would be useful for vehicle maintenance, for tax calculations, and for monitoring vehicle usage. Furthermore it has the following additional advantages:

1. It is easy to install in that it only requires the operator to plug the device into a power source and (1) for GPS operation; to place the device in view of overhead satellites, and (2) for image capture operation; to mount and align a camera to face the odometer.
2. It provides a convenient means for a vehicular operator to record audible information about vehicular trips.
3. It reminds the vehicle operator to record important information business, medical, and charitable mileage tax deductions.
4. It automatically keeps track of mileage for each trip.
5. It provides a simple means for recording necessary information in anticipation of an IRS audit.
6. It provides a means for recording vehicular information in the event of an accident.
7. It records information for vehicle maintenance.

While the invention has been described in the specification and illustrated in the drawings with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

Thus the scope of the invention should be determined by the appended claims and their legal equivalents, and not by the examples given.

We claim:

1. A portable electronic device for use inside a motor vehicle to collect and store information regarding operation of the motor vehicle, the portable electronic device comprising:

a digital memory;

means for automatically detecting that the motor vehicle has started a new trip;

means for, in response to the detecting that the new trip has started, providing to an occupant of the motor vehicle at the start of the new trip an option of designating the new trip as a continuation of a prior trip;

means for generating data during the new trip representing distance traveled during the new trip; and means for storing the data representing the distance traveled during the trip in the digital memory by:

adding the data representing distance traveled during the new trip to data stored in the digital memory representing distance traveled during the prior trip if the occupant designated the new trip as a continuation of the prior trip, or storing the data representing distance traveled during the new trip in the digital memory in association with a new trip identifier identifying the new trip if the occupant did not designate the new trip as a continuation of the prior trip.

2. The portable electronic device of claim 1 further comprising:

an electronic display; and means for causing to be displayed on the electronic display data stored by the storing means in the digital memory.

3. The portable electronic device of claim 1, wherein the microprocessor detects that the motor vehicle has started a new trip each time an engine of the motor vehicle is turned on.

4. The portable electronic device claim 3, wherein the microprocessor detects that the motor vehicle has started a new trip each time the motor vehicle moves following a minimum period during which the motor vehicle did not move.

5. A method of recording data in a portable electronic device regarding a trip in a motor vehicle, the method comprising:

automatically detecting, utilizing a microprocessor that is part of the portable electronic device, that the motor vehicle has started a new trip;

in response to the microprocessor detecting that the new trip has started, providing to an occupant of the motor vehicle an option of designating the new trip as a continuation of a prior trip;

during the trip, collecting, utilizing the microprocessor, data during the new trip representing distance traveled during the new trip; and storing in a digital memory that is part of the portable electronic device the data representing the distance traveled during the new trip by:

if the occupant designated the new trip as a continuation of the prior trip, adding the data representing the distance traveled during the new trip to data previously stored in the digital memory representing distance traveled during the prior trip, a sum of the data representing the distance traveled during the new trip and the data representing distance traveled during the prior trip stored in the digital memory in association with a trip identifier that identifies the prior trip, or if the occupant did not designate the new trip as a continuation of the prior trip, storing the data representing the distance traveled during the new trip in the digital memory in association with a trip identifier identifying the new trip.

6. The method of claim 5 further comprising:

if the occupant designated the new trip as a continuation of the prior trip, displaying on an electronic display that is part of the electronic device the sum of the data representing the distance traveled during the new trip and the data representing the distance traveled during the prior tripe from the digital memory, or if the occupant did not designate the new trip as a continuation of the prior trip, displaying on the electronic display the data representing distance traveled during the new trip stored in the digital memory.

7. The method of claim 5, wherein the microprocessor detects that the motor vehicle has started a new trip each time an engine of the motor vehicle is turned from off to on.

8. The method of claim 5, wherein the automatically detecting comprises determining that the motor vehicle has moved following a minimum period during which the motor vehicle did not move.

9. The method of claim 8, wherein the determining that the motor vehicle has moved comprises:

periodically determining a location of the motor vehicle utilizing a global positioning system, and providing the location of the motor vehicle to the microprocessor.

10. The method of claim 5 further comprising automatically detecting, utilizing the microprocessor, that the motor vehicle has ended the new trip.

11. The method of claim 5 further comprising:

converting into audio data information regarding the trip spoken by an occupant of the motor vehicle; and if the occupant designated the new trip as a continuation of the prior trip, storing the audio data in the memory in association with the identifier identifying the prior trip, or if the occupant did not designate the new trip as a continuation of the prior trip, storing the audio data in the memory in association with the identifier identifying the new trip.

12. The method of claim 11, wherein the audio data information regarding the trip spoken by the occupant describes a purpose and destination of the trip.

13. The method of claim 5 further comprising:

receiving category data from the occupant of the motor vehicle representing a category designation for the trip; and if the occupant designated the new trip as a continuation of the prior trip, storing the category data in the memory in association with the identifier identifying the prior trip, or if the occupant did not designate the new trip as a continuation of the prior trip, storing the category data in the memory in association with the identifier identifying the new trip.

14. The method of claim 13, wherein the category data includes an identifier identify a tax deduction status for the trip.

* * * * *